(12) United States Patent
Figueiredo

(10) Patent No.: US 10,788,360 B2
(45) Date of Patent: Sep. 29, 2020

(54) SCENE GENERATION USING SURFACE PLASMON POLARITONS

(71) Applicant: Truventic, LLC, Orlando, FL (US)

(72) Inventor: Pedro N. Figueiredo, Longwood, FL (US)

(73) Assignee: Truventic, LLC, Orlando, FL (US)

( * ) Notice: Subject to any disclaimer, the term of this patent is extended or adjusted under 35 U.S.C. 154(b) by 5 days.

(21) Appl. No.: 16/262,166

(22) Filed: Jan. 30, 2019

(65) Prior Publication Data
US 2019/0234795 A1    Aug. 1, 2019

Related U.S. Application Data

(60) Provisional application No. 62/623,808, filed on Jan. 30, 2018.

(51) Int. Cl.
*G01N 21/3581* (2014.01)
*G01J 1/08* (2006.01)
(Continued)

(52) U.S. Cl.
CPC .............. *G01J 1/08* (2013.01); *G01J 1/0477* (2013.01); *G01J 1/44* (2013.01); *G01J 2001/083* (2013.01)

(58) Field of Classification Search
CPC ....... G01N 21/3504; G01N 2021/1793; G01N 2021/3531; G01N 2021/6423; G01N 21/6428; G01N 21/643; G01N 21/645; G01N 21/648; G01N 2201/06106; G01N 2201/068; G01N 2201/127; G01N 33/227; G01N 2021/641; G01N 21/314; G01N 21/636; G01N 21/6408; G01N 2201/0221; G01B 11/245; G01B 11/25; G02B 26/02; G02B 27/1006; G02B 27/1046; G02B 27/1053; G02B 27/1073; G02B 27/142; G02B 27/143; G02B 27/144; G02B 27/145; G02B 27/149; G02B 27/283; G01J 1/0407; G01J 3/36; G01J 3/2823; G01J 3/0208;
(Continued)

(56) References Cited

U.S. PATENT DOCUMENTS 4,479,039 A * 10/1984 Payne ................ H01H 35/2657
                                                  200/406
5,149,969 A *  9/1992 Fouilloy ................ G02B 23/08
                                                  250/334
(Continued)

OTHER PUBLICATIONS

Andreas Otto; "Excitation of Nonradiative Surface Plasma Waves in Silver by the Method of Frustrated Total Reflection"; Zeitschrift fur Physik; vol. 216; pp. 398-410; 1968.
(Continued)

*Primary Examiner* — Irakli Kiknadze
(74) *Attorney, Agent, or Firm* — Christopher M. Ramsey; GrayRobinson, P.A.

(57) ABSTRACT

An infrared scene generator can generate a second infrared scene representative of a first infrared scene by emitting a beam of electromagnetic radiation onto a plurality of prism-coupled electrically conductive elements that modulate a portion of the beam incident thereon with surface plasmon polaritons based on parameters of the first infrared scene to yield a modulated beam that produces the second infrared scene.

20 Claims, 13 Drawing Sheets
(6 of 13 Drawing Sheet(s) Filed in Color)

(51) Int. Cl.
*G01J 1/04* (2006.01)
*G01J 1/44* (2006.01)

(58) Field of Classification Search
CPC .. G01J 2005/0077; G01J 5/0014; G01J 5/522; G01J 2003/2826; G01J 3/0232; G01J 3/12; G01J 3/28; G01J 1/58; G01J 2003/283; G01J 3/0256; G01J 3/0297; G01J 5/0806; G01J 1/0477; G01J 1/08; G01J 1/44; G01J 2001/083; G01J 5/0803; G01J 5/524; H04N 13/239; H04N 13/254; H04N 13/207; H04N 13/211; H04N 13/243; H04N 13/257; H04N 13/271; H04N 13/296; H04N 13/332; H04N 13/398; H04N 2013/0081; H04N 2209/046; H04N 5/33; H04N 5/3532; H04N 5/3535; H04N 5/372; H04N 5/2226; H04N 5/2256; H04N 5/361; H04N 5/374; H04N 5/3745; G01S 17/08; G01S 17/14; G01S 17/18; G01S 17/89; G01S 7/4863
USPC .......................... 250/341.1, 334, 330, 504 R
See application file for complete search history.

(56) References Cited

U.S. PATENT DOCUMENTS

| | | | | |
|---|---|---|---|---|
| 8,593,507 | B2* | 11/2013 | Yahav | H04N 5/232 348/46 |
| 9,562,849 | B2* | 2/2017 | Kester | G01J 3/28 |
| 2003/0213923 | A1* | 11/2003 | Kongable | G01J 5/522 250/504 R |

OTHER PUBLICATIONS

Bialkowski, Stephen; "Simple Scheme for Variable High-Power Laser Beam Attenuation"; Review of Scientific Instruments; vol. 58, p. 2338; 1987; https://doi.org/10.1063/1.1139651; Submitted May 11, 1987; Accepted Aug. 27, 1987; Published online, Sep. 9, 1998.
Cleary et al.; "Infrared Surface Plasomon Resonance Biosensor".
Cleary et al.; "Infrared Surface Polaritons on Antimony"; Optical Society of America, Optics Express; vol. 20, No. 3; Jan. 30, 2012.
Cleary et al.; "IR Permittivities for Silicides and Doped Silicon"; Optical Society of America; vol. 27, No. 4; pp. 730-734; Apr. 2010.
Cleary et al.; "Platinum Germanides for Mid-and Long-Wave Infrared Plasmonics"; Optical Society of America; Optics Express; vol. 23, No. 3; Feb. 9, 2015.
Fritz Keilmann; "Precision Broadband Far-Infrared Attenuator"; SPIE, vol. 666; Far-Infrared Science and Technology; pp. 213-218; Sep. 26, 1986.
Khalilzadeh-Rezaie et al.; "Infrared Surface Polaritons on Bismuth"; Journal of Nanphotonics; vol. 9; 2015.
Peale et al.; Electrodynamic Properties of Aqueous Spray-Deposited snO2:F Films for Infrared Plasmonics; Optical Engineering, SPIEDigital Library; vol. 56(3); Mar. 2017.
Peale et al.; "Incoherent Saturation Study of the Selenium Donor in Alsb"; Solid State Communications; vol. 60, No. 9; pp. 753-755; 1986.
Rezadad et al.; "Micro Electro Mechanical Cantilever with Electrostatically Controlled Tip Contact"; Applied Physics Letters vol. 105; 2014.
Scott D. Hanton; "Variable Attenuator for High-Power Lasers"; Review of Scientific Instruments; vol. 64; pp. 1456-1458; 1993; https://doi.org/10.1063/1.1144062; Submitted Jan. 8, 1993; Accepted Feb. 16, 1993; Published Online Jun. 4, 1998.
Shahzad et al.; Infrared Surface Plasmons on Heavily Doped Silicon; Journal of Applied Physics; vol. 110; 2011.
Wu et al.; "A Large Vertical Displacement Electrothermal Bimorph Microactuator with Very Small Lateral Shift"; Science Direct, Sensors and Actuators; vol. A 145-146; pp. 371-379; 2008.

* cited by examiner

SCENE GENERATION USING SURFACE PLASMON POLARITONS

CROSS-REFERENCE TO RELATED APPLICATIONS

This claims the benefit of priority to U.S. provisional Application No. 62/623,808, filed Jan. 30, 2018, which is incorporated by reference in its entirety.

STATEMENT REGARDING FEDERALLY SPONSORED RESEARCH OR DEVELOPMENT

This invention was made with government support under contract FA865118C0073 awarded by the U.S. Air Force. The government has certain rights in the invention.

FIELD

This relates to the field of infrared scene generation and, more particularly to generating infrared scenes using surface plasmon polaritons.

BACKGROUND

In order to test and develop infrared imaging devices, it is often useful to use an infrared scene generator to produce an infrared scene that simulates a real-world infrared scene. A conventional infrared scene generator is a device that generates a two-dimensional infrared scene from an array of infrared-emitting pixels. Infrared scene generators are regularly used in hardware-in-the-loop testing and other forms of simulation.

Conventional approaches to infrared scene generation include resistive arrays, light emitting diodes (LED), laser arrays, and liquid-crystal and digital-micromirror-devices (DMD)-based spatial light modulators. Although these approaches are useful, they are not without drawbacks.

BRIEF SUMMARY

It would be advantageous to have an infrared scene generator that overcomes the aforementioned drawbacks of conventional infrared scene generators. Such an infrared scene generator and related scene generation method is described here.

A first example of the advantageous scene generator includes an infrared emitter that emits a beam of infrared radiation and optical device on which the beam is incident. The optical device includes at least one prism and an array of electrically conductive elements, which are respectively separated from the at least one prism by an adjustable distance. The optical device modulates an intensity of the beam by selectively exciting dissipative surface plasmon polaritons on the electrically conductive elements and reflects a modulated beam therefrom. The scene generator also includes a controller storing a two-dimensional (2D) array of values that represent the spatial distribution of infrared intensities for a first infrared scene and program instructions to adjust the distances in the optical device in such a way that the reflected modulated beam comprises in cross section a 2D intensity distribution, which after passing through suitable optics of an infrared imaging system produces a second infrared scene representative of the first infrared scene.

Implementations of the first example of the scene generator may include one or more of the following features.

The beam incident on the optical device may be collimated, polarized, and substantially monochromatic.

The first infrared scene may include a set of first infrared scene pixels having respective infrared intensity values and program instructions are operable to adjust the distances in the optical device according to the respective infrared intensity values.

The scene generator may also include a degree of modulation at a particular spatial location within the modulated beam based on the infrared intensity value of the first infrared scene pixels at a corresponding spatial location in the first infrared scene.

The optical device may include one prism.

The optical device may include a separate prism per each electrically conductive element.

The electrically conductive element may be made from a material whose permittivity $\varepsilon$ has a real part that is negative, $Re[\varepsilon]=\varepsilon'<0$, at a wavelength of the beam.

A second example of the scene generator includes a data file including infrared intensity values of pixels of a first infrared scene. An infrared emitter emits a collimated monochromatic beam of linearly-polarized infrared radiation, whose electric-field is polarized in the plane of incidence. An optical device on which the beam is incident includes at least one prism and an array of electrically conductive elements. The electrically conductive elements are respectively separated from the at least one prism by an adjustable distance. The optical device modulates an intensity of the beam by selectively exciting dissipative surface plasmon polaritons on the electrically conductive elements and reflects a modulated beam therefrom. A controller stores program instructions operable to adjust the distances in such a way that the modulated beam can produce in an infrared imager a second infrared scene representative of the first infrared scene. The second infrared scene has two-dimensional spatial components corresponding with locations of the pixels of the first infrared scene. The infrared intensity values of the two-dimensional spatial components in the second infrared scene are based on the infrared intensity values of the pixels of the first infrared scene.

Implementations of the second example of the scene generator may include one or more of the following features.

The program instructions may be operable to adjust the distances according to the respective infrared intensity values of the pixels of the first infrared scene.

A degree of modulation at a particular spatial location within the modulated beam may be based on the infrared intensity value of at least one of the first infrared scene pixels at a corresponding spatial location in the first infrared scene.

The optical device may include one prism.

The optical device may include a separate prism per each electrically conductive element.

The electrically conductive elements may be made from a material having $\varepsilon'<0$ at a wavelength of the beam.

An example of an advantageous infrared scene generation method includes generating a second infrared scene representative of a first infrared scene by emitting a beam of electromagnetic radiation onto a plurality of prism-coupled electrically conductive elements that modulate a portion of the beam incident thereon with surface plasmon polaritons based on parameters of the first infrared scene, yielding a modulated beam that includes a 2D intensity distribution for the second infrared scene.

Implementations of the method may include one or more of the following features.

The beam may be collimated, polarized, and monochromatic.

The parameters of the first infrared scene may include a set of infrared intensity values corresponding with first infrared scene pixels.

A degree of modulation at a particular spatial location within the modulated beam may be based on the infrared intensity value of at least one of the first infrared scene pixels at a corresponding spatial location in the first infrared scene.

A degree of modulation produced by a respective electrically conductive element may be adjusted by changing a distance between the electrically conductive element and the prism.

One prism per a plurality of electrically conductive elements may be included.

A separate prism per each electrically conductive element may be included.

The electrically conductive elements may be made from a material having $\varepsilon'<0$ at a wavelength of the beam.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF EXAMPLE EMBODIMENTS

This disclosure describes example aspects and embodiments, but not all possible aspects embodiments of the scene generator and its related methods. Where a particular feature is disclosed in the context of a particular aspect or embodiment, that feature can also be used, to the extent possible, in combination with and/or in the context of other aspects and embodiments. The scene generator and methods may be embodied in many different forms and should not be construed as limited to only the embodiments described here.

Figure 1:
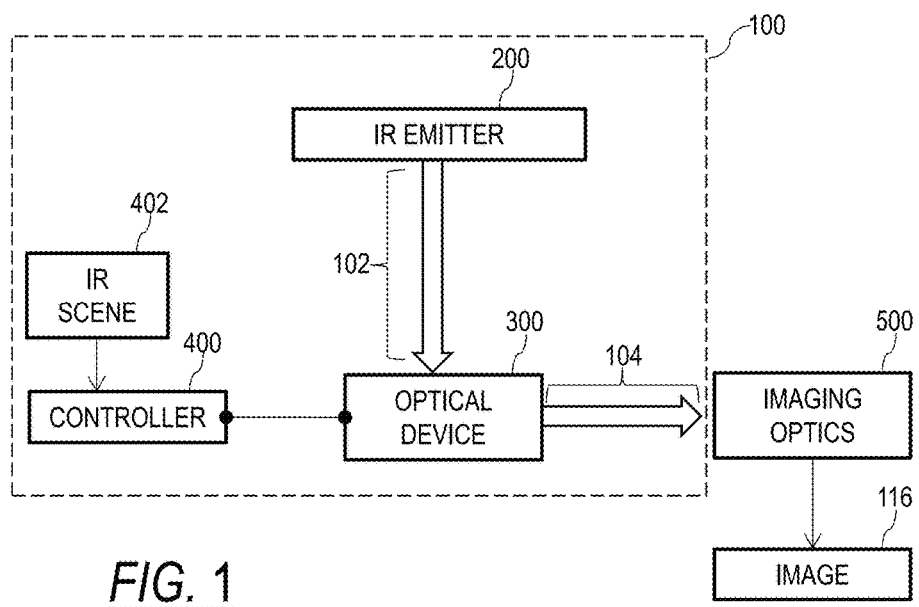
FIG. 1 is a block diagram of an example of a scene generator.

Referring to FIG. 1 an example of the infrared scene generator 100 includes an infrared emitter 200 emitting a beam 102 of infrared radiation, which is incident on an optical device 300. The optical device 300 modulates the incident beam 102 intensity to produce a spatially modulated beam 104. The spatial modulation comprises variations in the intensity in a 2D cross section of beam 104 in a plane perpendicular to its propagation direction. A controller 400 in communication with the optical device 300 stores a 2D array of values representing the infrared intensity variations in a first infrared scene 402 to be emulated in the physical beam 104 by the optical device 300. The controller 400 is operable to control the optical device 300 in such a way that the modulated beam 104, when projected onto a focal plane by suitable imaging optics 500, produces an image, or second infrared scene 116, representative of the first infrared scene 402. A user of infrared scene generator 100 can provide imaging optics 500 to produce the image 116, which may be detected using a focal plane array infrared detector.

The first infrared scene 402 may include a set of intensity values for infrared radiation emitted or reflected by actual, real-world objects. The first infrared scene may 402 may, in the alternative, be a simulated or computer generated scene. The first infrared scene 402 may include, for example, military targets such as missiles, aircraft, vehicles, or personnel. The first infrared scene 402 may change with time, so that a series of first infrared scenes may be recorded or generated to produce a video of a scene.

Figure 2:
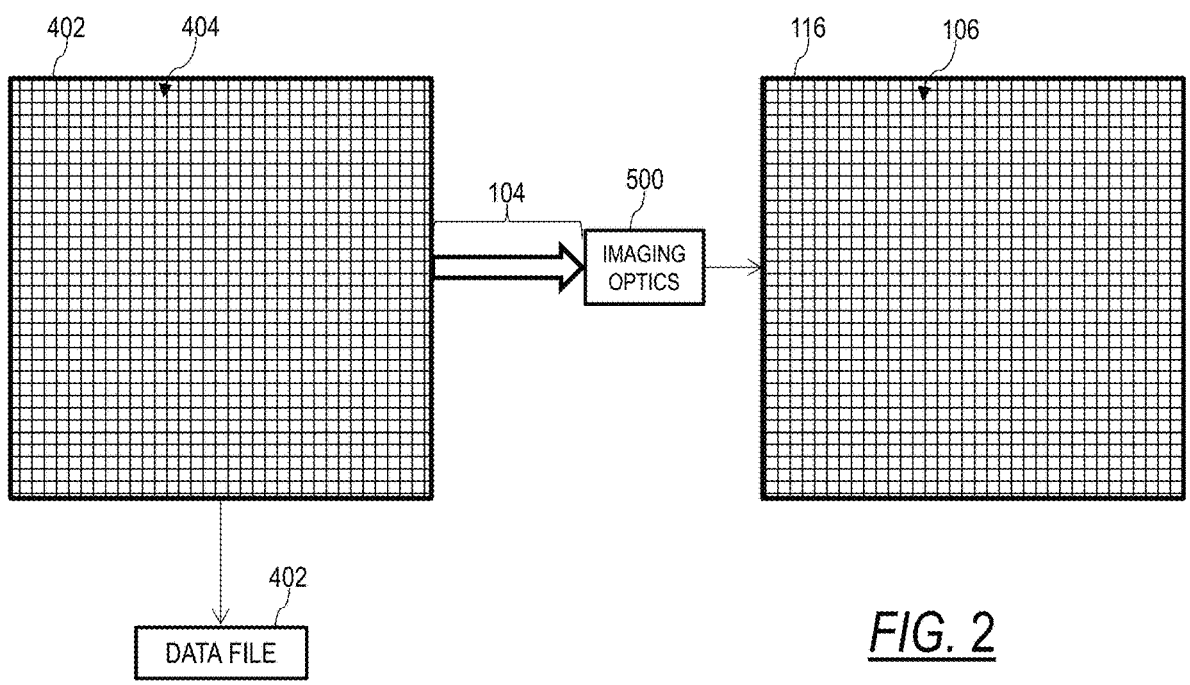
FIG. 2 is a block diagram illustrating an example of a first infrared scene and a second infrared scene.

Referring to FIG. 2, the first infrared scene 402 is a reference scene that has been previously electronically recorded. The scene may be a still image, series of still images, a video, or the like. The first infrared scene 402 includes an array of numerical values that represent the infrared intensity emitted or reflected by sub-areas of an actual or simulated scene known as picture elements (pixels) 404. The infrared intensity value corresponds to the intensity of the infrared signal recorded for the corresponding spatial location of each pixel. There are many ways to represent the infrared intensity values, including by power and source temperature among others.

In many cases, infrared images are color-coded so that a particular color corresponds to a particular temperature or other measure of infrared intensity. In such cases, the infrared intensity values may correspond with the color of each individual pixel in the scene.

The right panel of FIG. 2 is an illustration of the modulated beam 104 projected by imaging optics 500 onto a focal plane to produce an image or second infrared scene 116. In a particular example, discrete spatial locations 106 in the image 116 corresponding to the spatial locations of pixels in the first infrared scene 402 may be assigned an apparent temperature to emulate a real-world infrared image.

After the incident beam is reflected by the different conducting elements in the optical device 300, the reflected beam associated with each conductive element will spread, so that the spatial intensity distributions of the different sub-beams will spatially overlap. A simple cross section of the modulated beam 104 will not contain a clear subdivision of intensity values corresponding to those in the pixels of 402. The imaging optics 500, however, are operable to produce the second infrared image 116 from the modulated beam 104, where the spatial intensity variations are so subdivided.

Figures of merit for IR scene generators include maximum radiant intensity, dynamic range, and grayscale resolution. These can be quantified in terms of apparent temperature of the scene. Higher apparent temperature requires higher intensity at the detection system. High dynamic range of apparent temperature requires that the intensity be variable over many orders of magnitude. Grayscale resolution means that the least significant bit of control voltage change should give a small change in apparent temperature.

The infrared intensity values of a given scene may be tabulated based on the intensity value and the location in two-dimensional space of each pixel in the scene. When stored on the controller 400, the controller 400 uses the infrared intensity values to control the degree to which the incident beam 102 is modulated by the optical device 300 at different positions within the optical device 300 corresponding to the pixel locations in the first infrared scene 402.

Additional details of the optical device 300 are now described with reference to FIGS. 3-5.

The optical device 300 functions as a spatial infrared-radiation modulator based on variable reflection from an array of modulating elements 310. The modulating elements 310 each include a prism 312 and an electrically conductive element 314 separated by a variable gap d. FIG. 4 depicts one such element. The incident light interacts with the surface 320 of electrically conductive element 314 via a close-coupled, but non-contacting, prism 312. The intensity of the incident beam is variably modulated at each modulating element 310 in the array 300 by excitation of surface plasmon polaritons ("SPP") on the surface 320 of the respective electrically conductive element 314. The SPP excitation depends exponentially on the distance d separating the prism 312 and the surface 320 of the electrically conductive element 314.

An SPP is a surface-bound inhomogeneous electromagnetic wave that is coupled to a electric polarization that occurs within the plasma of free charge carriers at the surface of a conductor [1]. The charge carriers may be electrons, or in the case of p-type semiconductors, they may be holes. The energy of the SPP is dissipated by Joule heating due to the excited currents in the conductor. By means of this dissipation of the energy of the excited SPPs, energy from an incident beam of radiation can be permanently removed, resulting in an attenuated reflected beam.

Figure 4:
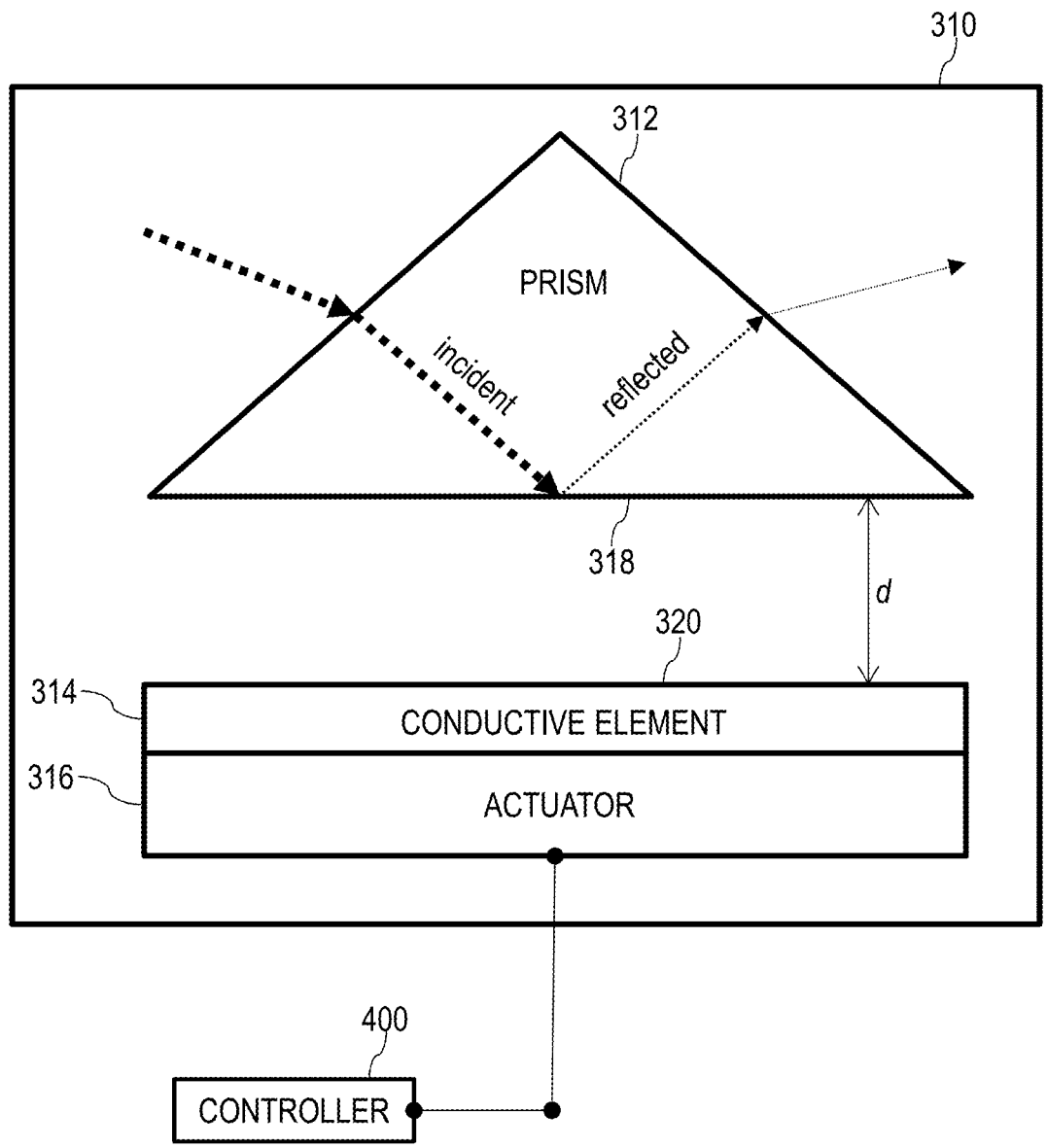
FIG. 4 is a block diagram illustrating an example of an optical device having one modulating element.

A prism-based method of exciting SPPs on a conductive surface, depicted in FIG. 4, is known as the Otto coupler [2]. In an Otto coupler, a prism made from a material that is transparent for the incident beam, and with an index of refraction that exceeds unity, is brought close to, but not in contact with, a conducting surface. When the distance of separation d is optimum, and when the beam's angle of incidence on the internal prism surface near the conductor is at a resonance angle, SPPs are generated on the conductor, and the intensity of the internally reflected beam is reduced.

Figure 3:
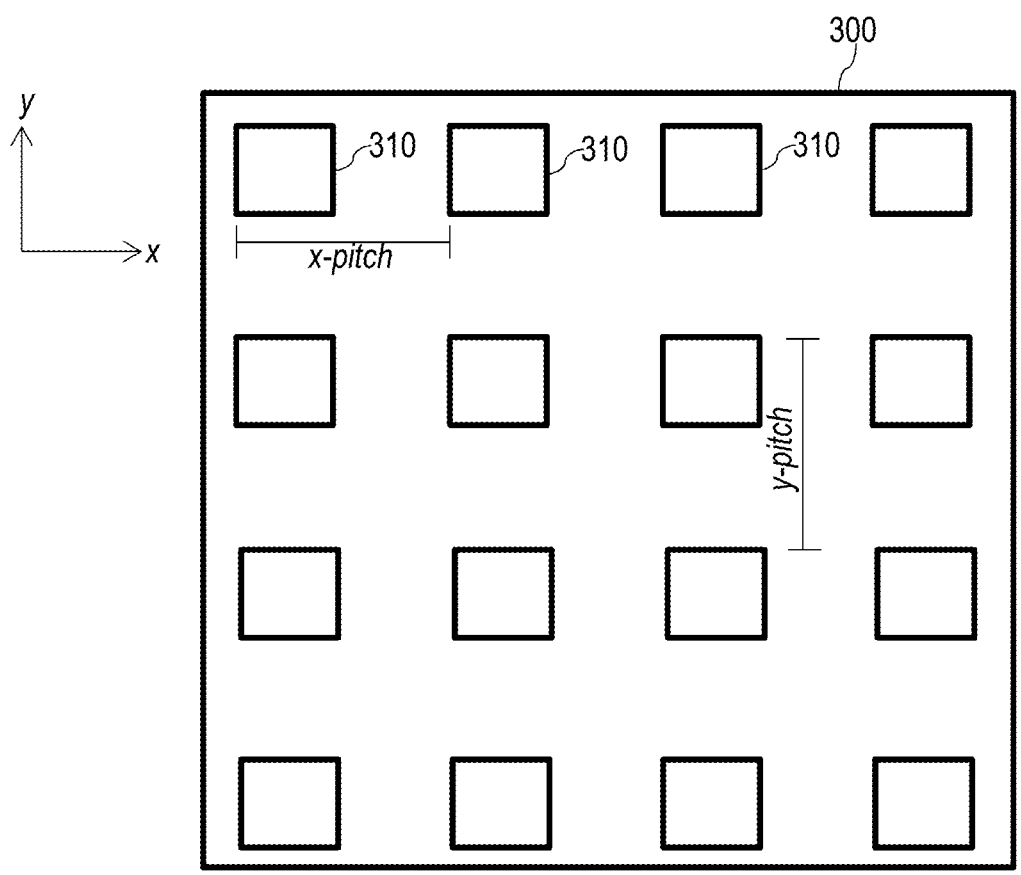
FIG. 3 is a block diagram illustrating an example of an array of modulating elements.

Referring to FIG. 3, an example of the optical device 300 includes a plurality of modulating elements 310 arranged in a two-dimensional grid pattern, or array, in x and y directions. Each modulating element 310 is placed generally in a periodic array with period, or pitch, which may be different in x and y directions. The number of modulating elements 310 determine the spatial resolution of the image 116 that can be produced by the subsequent imaging optics 500. For a given number of modulating elements, the pitch determines the overall dimensions of the optical device 300. The pitch may vary depending on the desired application and wavelength of the beam 102, among other factors. In a particular example, the x-pitch and the y-pitch are about 50 µm.

The example of FIG. 3 shows a 4 by 4 array of modulating elements 310 for ease of illustration. The array may include any number of modulating elements 310, depending on the desired spatial resolution for the image 116 of the scene and is not necessarily limited to any particular number or arrangement of modulating elements 310.

Referring to FIG. 4, a first example of the modulating element 310 includes a prism 312, an electrically conductive element 314, and an actuator 316. The actuator 316 is operable to adjust the distance d between a bottom surface 318 of the prism 312 and a top surface 320 of the electrically conductive element 314 based on instructions received from the controller 400.

The distance d between the bottom surface 318 of the prism 312 and the top surface 320 of the electrically conductive element 314 is one of the factors that determines the degree to which the incident radiation gets attenuated. This distance d is the parameter that is dynamically varied to produce variable attenuation to produce different second infrared scenes 116. The controlled variation of the distance d allows for the intensity of the reflected radiation associated with each modulating element 310 to be adjusted according to the intensity values of the pixels in the first infrared scene image data file stored on the controller 400.

Figure 5:
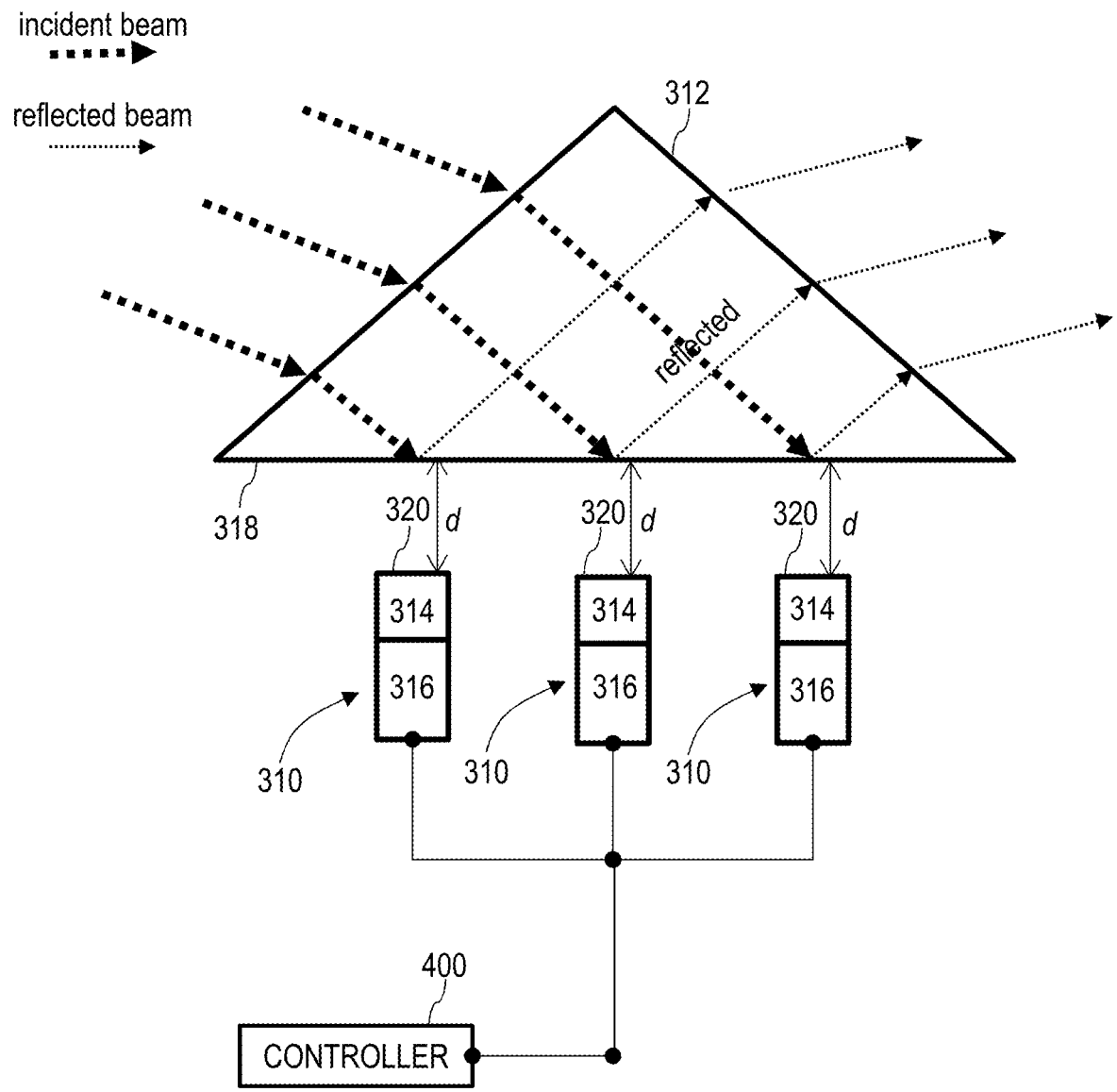
FIG. 5 is a block diagram illustrating an example of a multi-elements of an optical device having multiple modulating elements.

A second example of arrangement for the modulating elements 310 relative to the prism 312 is depicted in FIG. 5. In this arrangement, one prism 312 is coupled with a plurality conductors 314 and actuators 316 to form a plurality of modulating elements 310. Each actuator 316 can independently adjust the distance d between the top surface 320 of the respective electrically conductive element 314 and bottom surface 318 of the prism. The modulating elements 310 in such an example are arranged in a two dimensional array adjacent the prism 312 that forms a part of them.

The prism 312 is made of a material that is substantially transparent to the incident beam 112 and has an index of refraction greater than unity. The prism 312 may have a triangular cross-section or a hemi-cylindrical cross-section in the plane of incidence.

The electrically conductive element 314 may be selected from among many different materials including metals, semimetals, and semiconductors. The electrically conductive material is selected based on the wavelength of the incident beam 102. In order to create SPPs on the conductor, the plasma frequency of the conductor should be exceed the electromagnetic oscillation frequency corresponding to the beam wavelength. The real part of the complex permittivity of the material should be negative ($\varepsilon'<0$) at wavelengths equal to the beam's wavelength. In certain examples, the $\varepsilon'<0$, but is still near 0.

In some cases, semiconductors are particularly useful because their resistivity and permittivity spectrum can be engineered. For example, selecting a particular dopant and dopant concentration can cause the material's $\varepsilon'$ to have suitable negative values, so that the material will support SPPs with optimal properties for the attenuation application at the beam's wavelength.

The infrared emitter 200 is capable of emitting a beam of monochromatic or nearly monochromatic infrared radiation, with a wavelength that falls within the wavelength range of from about 1 μm to about 1000 μm.

The emitted beam is preferably as collimated and monochromatic as is practical for a given application. It is to be understood that the infrared emitter 200 may not always be capable of producing a purely monochromatic beam. Accordingly, this term "monochromatic" can include wavelengths that slightly deviate around a primary emitted wavelength of the infrared emitter 200.

Examples of suitable infrared emitters 200 include, but are not limited to quantum cascade LASERs, Blackbody sources with narrow-band-pass spectral filters, metasurface based emitters, light emitting diodes, gas-based lasers, chemical lasers, and discharge plasmas.

Infrared emitters 200 are not typically capable of emitting radiation over the entire infrared spectrum. Thus different infrared emitters are typically used to cover different regions of the infrared spectrum.

Additionally, since SPPs can only be excited with a beam that is polarized with its electric field in the plane of incidence, known as p-polarized or transverse magnetic, the beam should be so polarized to achieve the highest possible range of attenuation by the optical device. Many infrared emission sources are naturally polarized. If the source is not polarized, it may be polarized using a suitable polarizer.

The controller 400 may be a computer or the like having non-transitory computer memory and at least one computer processor capable of carrying out program instructions stored on the memory. In practice, the first infrared scene to be emulated by the optical device 300 is stored on the memory. The image data file in the memory includes the two-dimensional array of numerical values that represent the infrared intensity emitted or reflected from each pixel of an actual or simulated scene. Each of the image's pixels has an infrared intensity value assigned to it, which in an infrared scene corresponds to the brightness and/or color of that particular pixel.

The controller 400 is in operable communication with optical device 300 via conventional wiring or via wireless communication mechanisms. The controller 400 is operable to adjust the distance d for each modulating element 310 in the array. The distance d at each modulating element 310 can be variably adjusted to modulate the intensity of the beam that is internally reflected from the surface 318 of prism 312 at the position of that modulating element 310, so that the actual intensities at the pixels of the final image 116 reproduce the intensities associated with corresponding pixels of the first image data file 402 from the controller 400. The modulated beam 104 of reflected radiation from the optical device 300 produces a second infrared image representative of the first infrared image when projected by suitable imaging optics onto a focal plane.

To be "representative" of the first infrared scene 402, the second infrared scene 116 may be a substantially exact reproduction of the first infrared scene 402, but this is not necessarily always the case. If the first infrared scene 402 has a higher spatial resolution than the optical device 300 can produce, the second infrared scene 116 will be a lower-resolution approximation of the first infrared scene 402. Further, the second infrared scene 116 need not always appear in the same color scale as the first infrared scene 402. To be representative of the first infrared scene 402 all that is needed is for the second infrared scene 116 to be a close enough reproduction of the first infrared scene 402 to simulate the first infrared scene 402.

The optical device 300 may be calibrated so that a specified degree of modulation from each modulating element 310 corresponds to a particular infrared intensity value, represented by an effective temperature. In this manner the controller 400 can determine how much to adjust the distance d to achieve the desired infrared intensity value from the individual modulating elements 310 so that the modulated beam 104 can produce an infrared scene representative of the first infrared scene.

The actuator 316 is a mechanical device coupled to the electrically conductive element 314 and adapted to move the electrically conductive element 314 to adjust the distance d. The degree of adjustment in a particular example is on the order of several micrometers. In order to achieve such sensitive adjustment capability, the actuator may be a microelectromechanical system or "MEMS" device. Examples of suitable MEMS devices are now discussed.

The MEMS-based actuator should be able to vary d by several micrometers for the individual modulating elements 310 independently. The individual modulating elements typically have lateral dimensions on the order of tens-of-micrometers.

Figure 6:
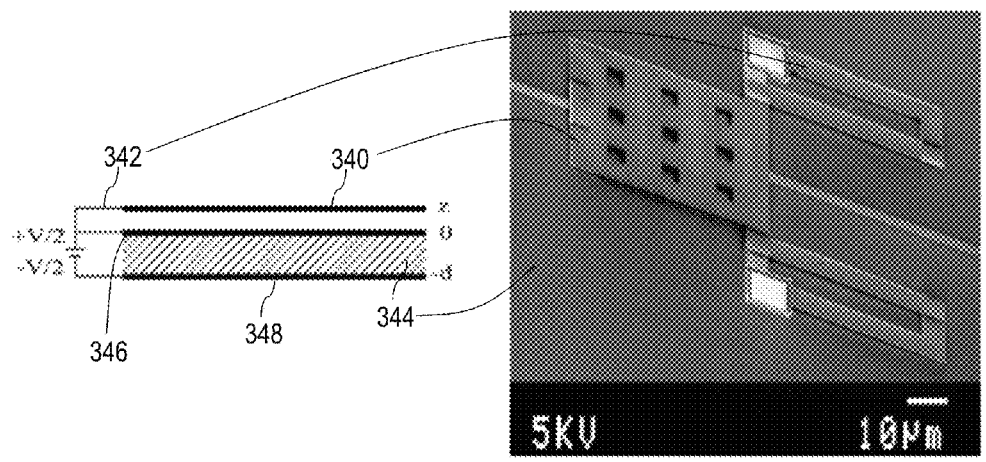
FIG. 6 (left) is a schematic of MEMS movable cantilever and (right) is an SEM image of MEMS cantilever that demonstrates controlled displacement.

One example of a MEMS-based actuator includes a cantilever, whose vertical displacement is controlled by electrostatic repulsion against an elastic restoring force [3]. FIG. 6 presents a schematic of this electro elastic MEMS device.

The cantilever 340 is suspended by arms 342 anchored to a substrate 344. Suitable charging of the cantilever 340 and surface plate 346 relative to a buried plate 348 results in an upwards vertical force on the cantilever. By close coupling of electrically conductive cantilevers 340 to a suitable prism 312, the optical device 300 may be constructed.

Figure 7:
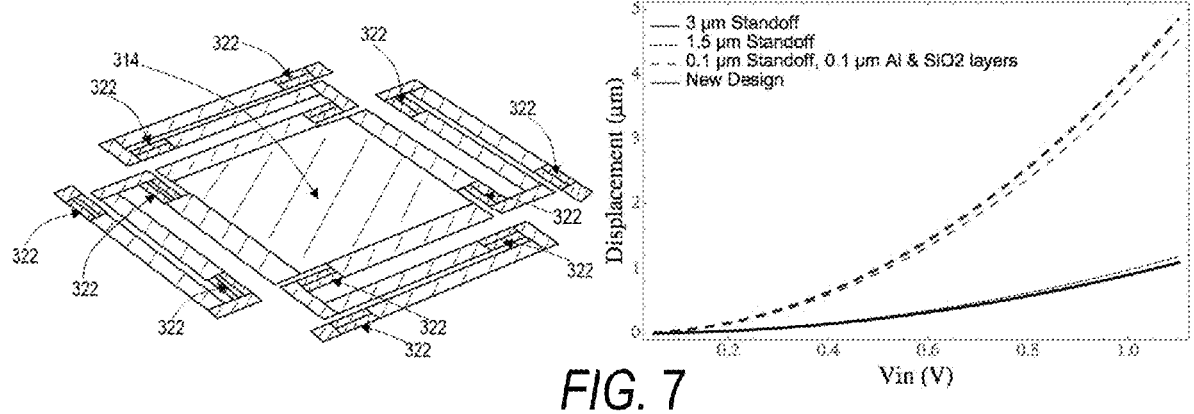
FIG. 7 (left) is a schematic of a moveable MEMS planar element design and (right) is a graph of the calculated displacement vs control voltage for the MEMS planar element.

Another example of a MEMS-based actuator is thermo-mechanically-controlled [4]. In this example, a conductive element 314 is moved by thermal deformation of a bimorph 322 in the supporting arms. FIG. 7 (left) present a schematic of a design with ~40 μm pitch considered in COMSOL thermomechanical calculations. The bimorph 322 in the arms includes an electrical heating element, which cause the arms to bend at the location of the heating.

FIG. 7 (right) presents COMSOL-calculated vertical displacement of the plate 314 as a function of control voltage, for a given heater resistance R, and for different design details. The displacement is linear in heat power Q, but it is quadratic in control voltage V, since $Q=V^2/R$. Four separate designs are considered in FIG. 7 (right). Displacements of several microns are achievable with control voltages less than 1 V.

The range of displacement of the actuator(s) 316 can vary depending on the application. In a typical example the displacement may be from about 0 μm to 10 μm.

The variation of the distances d by the actuator may be based on other physical displacement mechanisms, such as piezo-electricity or electrostatic attraction against a restoring spring force.

Implementations of the scene generator 100 may include one or more of the following advantages over conventional scene generators. Not every one of these advantages is necessarily achieved by every implementation.

The scene generator 100 may provide superior isolation between pixels, due to the highly confined nature of the SPP fields.

The scene generator 100 may operate at higher frame rates, as determined by the rate at which the distances d may be varied, in comparison to resistively-heated black-body emitter arrays, whose speed is limited by thermal time constants.

The scene generator may function at any wavelength from visible to far-infrared, though function will be optimized in each wave band using different conductive materials.

The scene generator may have unlimited maximum apparent temperature.

The array of modulation elements 310 in the optical device 300 of the scene generator 100 can be fabricated via standard silicon device processing to achieve large total number of modulating elements 310, and hence high spatial resolution for the second infrared scene 116 at low cost.

The scene generator may operate with continuous-wave signals.

The scene generator may have much lower power consumption than a resistor array.

EXAMPLES

This section describes example features of the scene generator 100 in more detail. The details described here are for illustration purposes only and do not limit the scope of possible features or example embodiments.
Selection of Electrically Conductive Material A parameter relevant to the excitation of SPPs on the electrically conductive element's surface is the plasma frequency of the electrically conductive material. The plasma frequency is proportional to the square root of the free charge-carrier concentration. SPPs can be excited on the surface of the conductive element if that conductive element's plasma frequency is higher than the frequency of oscillation of electromagnetic fields in the incident beam. Equivalently, SPPs can be excited on the surface of the conductive element if that conductive element's plasma wavelength, that corresponds to the plasma frequency of the conductor, is shorter than wavelength of the incident beam. This discussion is relevant to choosing a material for the electrically conductive element for the intended operating wavelength of the incident beam.

Several factors determine the degree of attenuation achieved by the SPP attenuation mechanism. These include the distance d and the plasma wavelength $\lambda_p$. Others include the wavelength of the incident beam, its angle of incidence, the refractive index of the prism, the complex permittivity of the electrically conductive element material, and the medium (if any) between the prism and electrically conductive element. These factors are inter-related.

The real part of the complex permittivity (ε') is negative beyond the plasma wavelength and positive below. A negative real part of the permittivity (ε'<0) is needed for an electrically conductive material to support an SPP.

The Otto coupling mechanism for SPP excitation is partly explained by momentum conservation in a quasi-particle description. In this picture, the function of the prism is to slow the photon, so that the component of its momentum in the plane of the conductor surface matches the smaller momentum of the SPP quasiparticle that the photon excites. This defines the resonance angle $\theta_{SPP}$ according to $$\text{Sin } \theta_{SPP} = (1/n)\text{Re}[\text{Sqrt}[\varepsilon/(\varepsilon+1)]] \quad (1)$$

where $\theta_{SPP}$ is the angle incidence within the prism on the prism surface 318, n is the refractive index of the prism, and ε=ε'+iε" is the frequency-dependent complex permittivity of the conductive material. The condition for total internal reflection (TIR) within the prism is that the angle of incidence θ of the beam internal to the prism on the prism surface 318 satisfy $\theta > \theta_{TIR}$, where $\text{Sin } \theta_{TIR} = 1/n$. For good conductors at infrared wavelengths, ε' is a large negative number and |ε'|>>ε">0. When this holds, it is determined from Eq. (1) that $\theta_{SPP} > \theta_{TIR}$, which is generally true even when ε" is not neglected. Also seen from Equation (1) is that when |ε'|>>1, the value of $\theta_{SPP}$ is only slightly greater than $\theta_{TIR}$.

Figure 8:
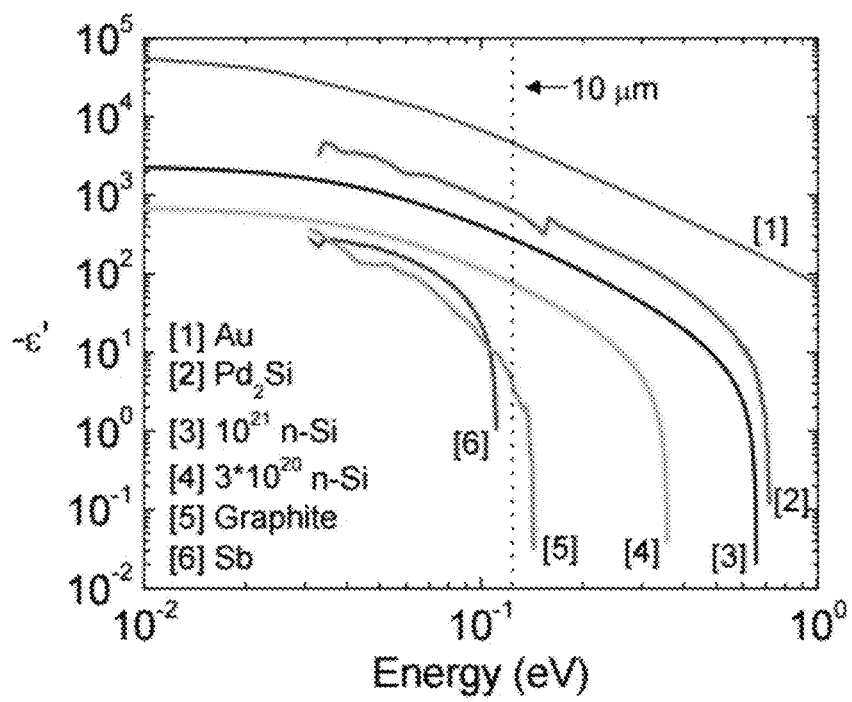
FIG. 8 is a graph the spectral variation in the negative of the real part of the permittivity $-\varepsilon'$ for different conductors.

To obtain an SPP resonance angle that is significantly beyond the TIR angle a small negative value of ε' at the operating wavelength of the incident beam is needed. This occurs for conducting materials whose plasma wavelength is only slightly shorter than the operating wavelength. FIG. 8 presents data that has important practical considerations for the selection of the conductive material for the optical device based on the design disclosed here.

FIG. 8 left presents a log-log plot of −ε' vs. photon energy for several different conductors [5]. Similar curves for most known conductors are available in the scientific literature, e.g. [6-10]. Where the curves dive downward indicates their approach to their zero crossings and sign change, which identify the plasma frequency. The vertical dashed line indicates the photon energy corresponding to 10 μm wavelength. The plasma frequency of the semimetal Sb is below this line, so that an SPP cannot be excited on Sb using an infrared beam with 10 μm wavelength. The plasma frequencies for the other materials are all above the line, thus an infrared beam with 10 μm wavelength can excite an SPP on those conductors. If 10 μm is the operating wavelength, then the resonance angle for graphite would be farther beyond the TIR angle than it would be for gold, according to Eq. (1).

Figure 9:
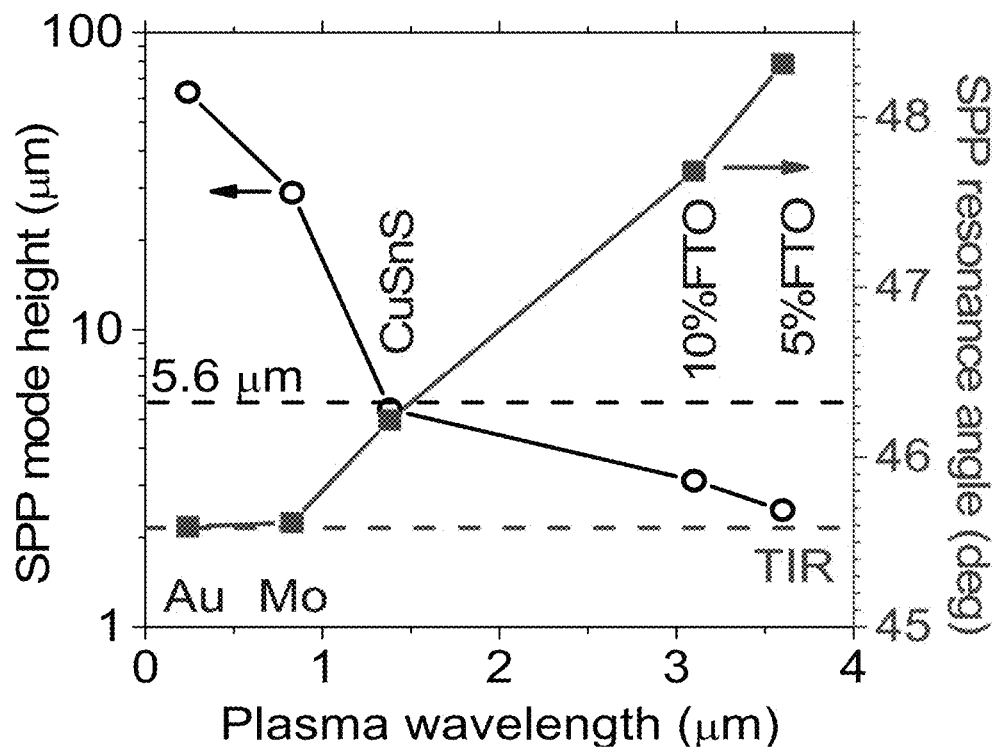
FIG. 9, solid square symbols, is a graph of the SPP resonance angle as a function of conductor plasma wavelength for an Otto coupler with $CaF_2$ prism and different conductors at 5.6 µm operating wavelength. The open circle symbols represent the characteristic SPP field decay length into air above the conductor surface as a function of plasma wavelength for different conductors. The horizontal line indicates the 5.6 µm operating wavelength for the infrared beam used to excite the considered SPPs.

FIG. 9 (solid square symbols) presents SPP resonance angles calculated from Eq. (1) at 5.6 μm operating wavelength for different electrically conductive materials as a function of their plasma wavelengths based on experimental complex permittivity spectra. For conductors with short plasma wavelengths, such as gold, and molybdenum, the SPP resonance angle almost coincides with the TIR angle, indicated by the dashed horizontal line labeled "TIR".

For the semiconductor CuSnS and for the conducting oxide F:SnO$_2$ (FTO) with different F concentrations [10], whose plasma wavelengths are closer to the operating wavelength, the SPP angle is farther from TIR. For FTO, the plasma wavelength can be set during growth to a value between 2 and 14 microns in the infrared [10].

SPPs are electromagnetic waves that are bound to the surface. The SPP fields decay exponentially with distance from the surface. The SPP wavefunction has a factor $\varepsilon^{-\kappa z}$, where z is the distance from the conductive surface. If the medium above the surface is vacuum or air, the factor $\kappa$ is given by equation 2.

$$\kappa=(2\pi/\lambda)\mathrm{Sqrt}[-1/(\varepsilon+1)]. \quad (2)$$

The characteristic decay length of the SPP field above the conductor surface is $L=1/\mathrm{Re}[\kappa]$. $\mathrm{Im}[\kappa]$ would be the wavenumber for oscillations normal to the surface, but $1/\mathrm{Im}[\kappa]\gg L$ always, so that there are no such oscillations of the SPP field. When L is very large, the SPP is weakly bound to the surface, and Joule losses are small. This affects the propagation distance of SPPs on the surface, but not the maximum achievable attenuation with an Otto coupler, as will be shown. The value of L does affect the optimum value of d. Optimum coupling occurs when d~L.

FIG. 9 (open circle symbols) presents L calculated from Eq. (2) as a function of plasma wavelength for different conductors at an operating beam wavelength of 5.6 µm. When the plasma wavelength is much smaller than the operating wavelength, L is large. When the plasma wavelength approaches the operating wavelength, L can be less than the free space operating wavelength, which is indicated by the horizontal dashed line labeled 5.6 µm.

Although the quasi-particle description of SPPs provides the resonance angle, it cannot quantify the coupling strength and the amount of attenuation for an Otto coupler. These observable effects are described by macroscopic classical-electrodynamic wave optics based on the complex permittivity and geometry of all materials in the structure. Thus, the reflectance as a function of materials, incidence angle, wavelength, and gap (d) dimension can be calculated using Fresnel equations or by numerical electrodynamic simulations.

Figure 10:
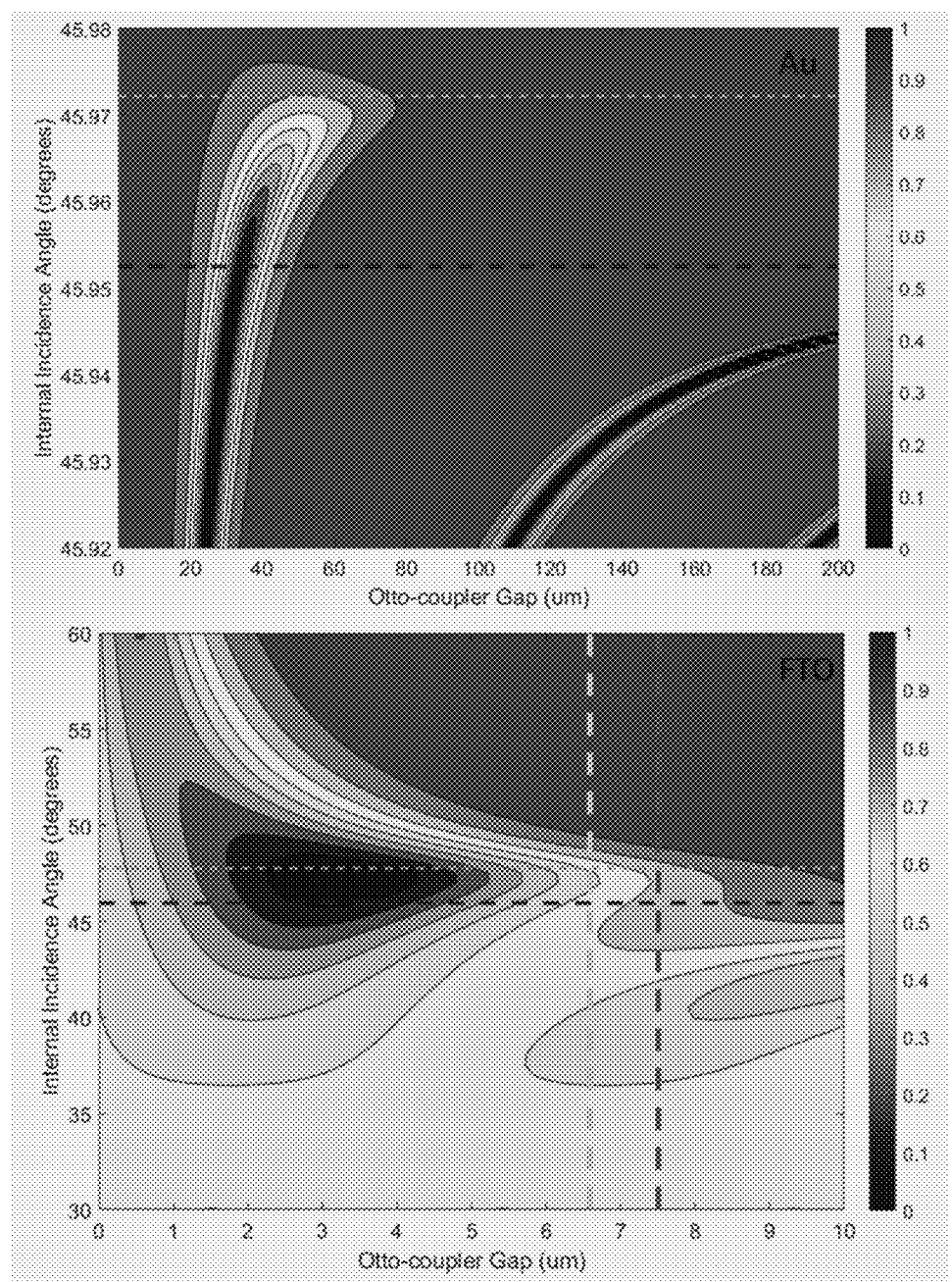
FIG. 10 is a graph of the calculated reflectance contours for $\lambda=5.6$ µm beam as function of Otto coupler air gap (d) and incidence angle for gold (top) and FTO (bottom).

FIG. 10 presents reflectivity contours calculated using the Fresnel equations as a function of angle and gap for an Otto coupler with gold (top) and 10% FTO sample (bottom) [10] as the conductors. The gap as used herein refers to the distance (d) between the prism surface and the conductive surface as discussed above. SPP resonance angles calculated from Eq. (1) are indicated by the horizontal short-dashed lines. The TIR angle is indicated by the horizontal long-dashed line.

Below TIR, there are a series of reflectance minima that remind one of transmission resonances for a Fabry-Perot etalon, though their separation in gap value is about 10× longer than the wavelength and power cannot be lost to transmission in this device. Only a single resonance occurs beyond TIR, and this appears at a gap value of ~60 µm. However, this resonance is less than 0.01 degrees beyond TIR, and its angular width is less than 0.01 degrees. Thus, an infrared attenuator based on an Otto coupler with gold conductor would require impractical alignment tolerances. Moreover, to significantly change the reflectance value would require a change in gap by tens of microns, which may be inconveniently large for a simple piezoelectric actuator.

For 10% FTO the resonance angle is conveniently several degrees beyond TIR. The resonance width in angle is conveniently broad, but in gap it is only a few microns wide. A reflectance change of nearly unity can be achieved by changing the gap by only several microns. Vertical dashed lines indicate gap values for the experiments discussed below.

Figure 11:
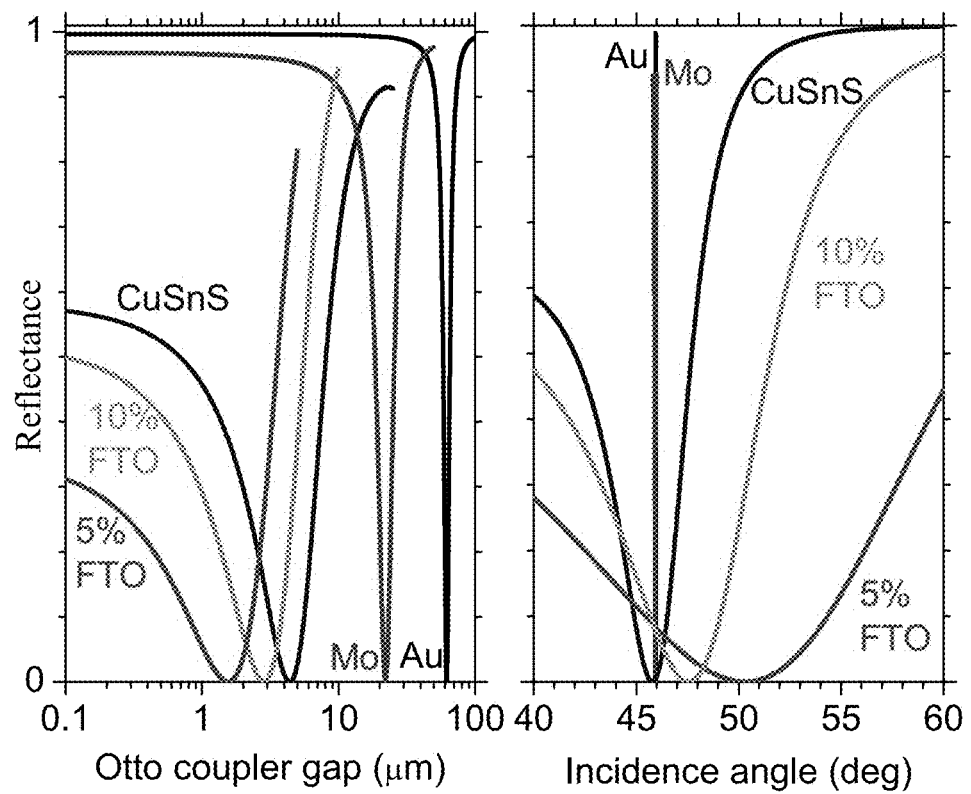
FIG. 11 is (right) is a graph of the reflectance vs incidence angle for different conductors at Otto coupler gap (d) values that give strongest SPP generation and (left) is a graph of the reflectance vs. Otto coupler gap (d) for different conductors at incidence angles that that optimize SPP generation.

FIG. 11 presents highlights of calculations such as those in FIG. 10. The curves in FIG. 11 (right) are vertical slices through contour plots such as FIG. 10 at values of the Otto-coupler gap d for which the reflectance is minimized. The minimum reflectance is close to zero for all materials. Good metals, such as Au and Mo, whose plasma wavelengths are much shorter than the operating wavelength, have SPP resonances very close to the TIR angle, and these resonances are angularly narrow. The sharpness of these resonances may require impractical optical alignment tolerances for the subject infrared scene generator 100. Conductors with longer plasma wavelengths closer to the operating wavelength have angularly broad resonances that peak farther from the TIR angle.

The curves in FIG. 11 (left) represent horizontal slices through contours such as in FIG. 10, at angles that optimize attenuation by SPP generation. Note that the horizontal scale is logarithmic, so that the resonances for good metals such as Au and Mo are actually the broadest as a function of gap d. Their resonances occur at d values of tens of microns, and the reflectance changes with gap distance over lengths scales of ~10 µm. The large gaps for resonance simplifies fabrication, but vertical displacement of 10 µm for an electrically conductive element that is itself only on the order of tens of microns in lateral dimensions would be challenging for a MEMS actuator. In contrast, the materials with long plasma wavelength have resonances that occur at gaps of 1 to 5 microns, and these resonances have significant variation for changes in gap of only ~2 µm, which is achievable by MEMS actuation for the relevant dimensions of the conductive elements.

Figure 12:
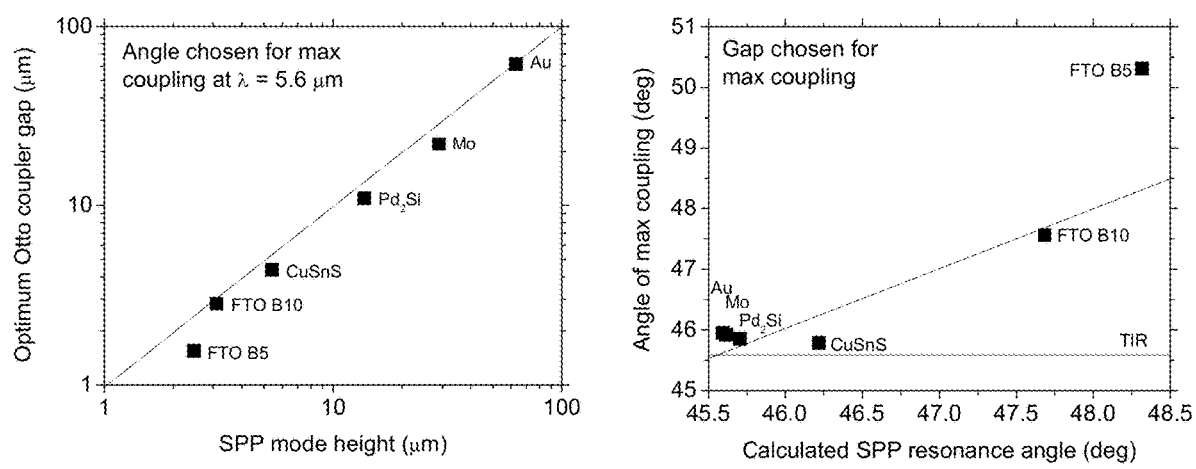
FIG. 12 (left) is a graph of the optimum Otto coupler gap (d) vs SPP mode height for different conductors at the optimum incidence angle for a beam with 5.6 µm wavelength, and (right) is a graph of the optimum incidence angle vs calculated SPP resonance angle for an Otto coupler with an optimized gap (d) for different conductors for a beam with 5.6 µm wavelength.

FIG. 12 (left) presents a plot of the optimum Otto gap for best coupling as a function of calculated SPP mode height. The figure shows that coupling is optimized when d~L, or when d is slightly smaller than L.

FIG. 12 (right) presents a plot of the incidence angle for optimum coupling as a function of the SPP resonance angle calculated from Eq. (1). The horizontal line indicates the TIR angle, and resonances for conductors with small plasma wavelength fall close to this line. The diagonal line with unity slope shows that the optimum coupling angle is sometimes greater and sometimes smaller than predicted by Eq. (1).

Figure 13:
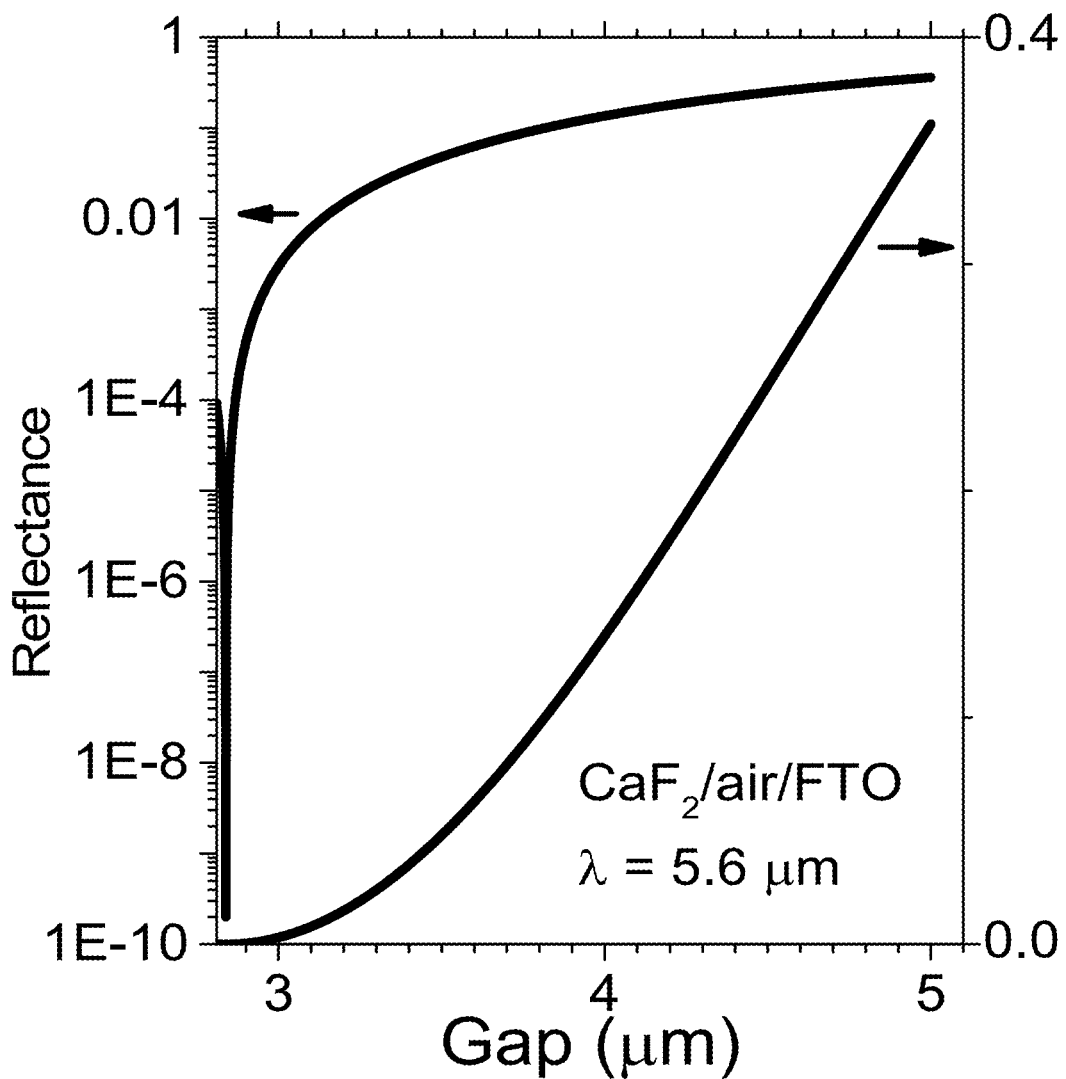
FIG. 13 is a graph of calculated reflectance vs. gap at optimum angle for $CaF_2$/air/FTO Otto-coupler at 5.6 µm operating wavelength.

FIG. 13 presents a calculation of reflectivity vs. gap at the angle of maximum attenuation for a $CaF_2$/air/FTO Otto coupler. The two curves are the same data plotted linearly and semi-logarithmically. The linear plot shows that a tenfold change in attenuation can be achieved with a gap change of ~1.5 microns. The semi-log plot shows that an attenuation by 9 orders of magnitude can be achieved in principle. However, expectations should be modified due to practical considerations. At the highest attenuation, the curve is very steep, so that positional control of ~10 nm would be required. It might be difficult to arrange an FTO sample that is even that smooth, considering that grain-sizes of this typically polycrystalline material are at least that large [10]. However, attenuation by up to 10000 times might be practical and controllable, which is better than usually obtained in laboratory and commercial variable infrared attenuators [12-17]. The plasmonic device presented here has the advantage that the attenuation might be rapidly changed under electronic control.

Figure 14:
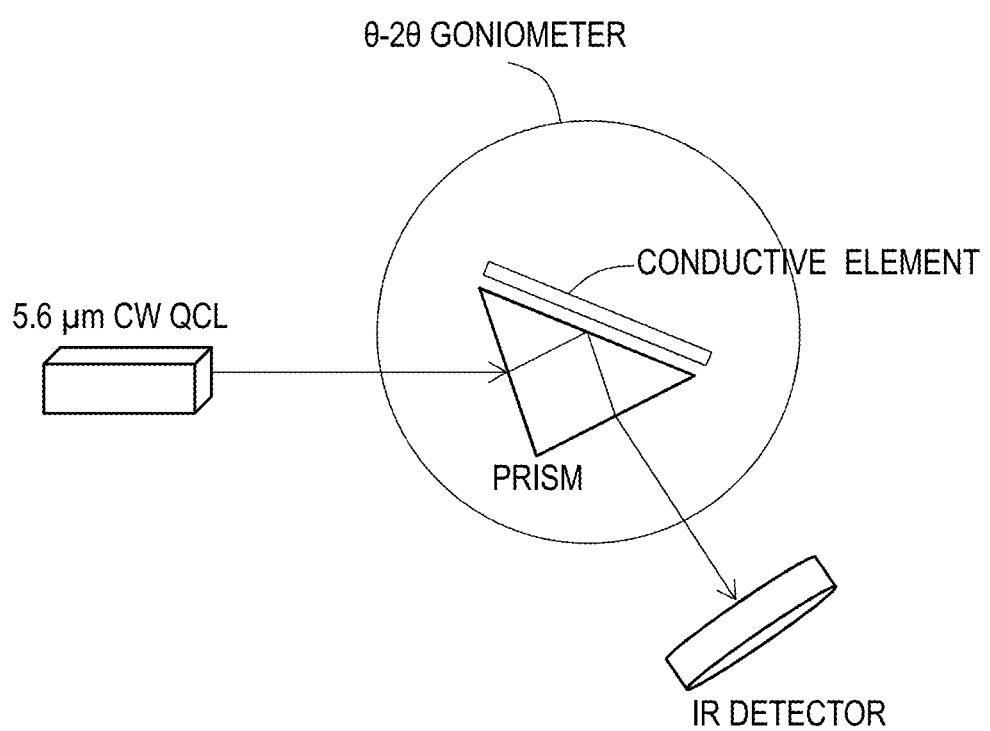
FIG. 14 is a block diagram of an example of an infrared Otto coupler experiment.

FIG. 14 presents a schematic of an experimental set-up. A continuous-wave collimated quantum cascade laser (QCL) source with 5.6 µm wavelength was used. A right-angle $CaF_2$ prism, which is transparent at the laser wavelength with refractive index value equal to 1.4 at that wavelength, was mounted on the θ axis of a θ-2θ goniometer. The specularly reflected beam from the internal prism surface was captured as a function of incidence angle by a thermopile detector mounted on the 2θ arm of the goniometer.

Different conductors with different conductivity were alternately placed at mechanically-adjustable distances to the prism surface. In order of increasing plasma wavelength, these were FTO and the semiconductor Si. For Si, the plasma wavelength is beyond 10 microns in the far infrared. The plasma wavelength of the FTO sample was ~1 µm.

Figure 15:
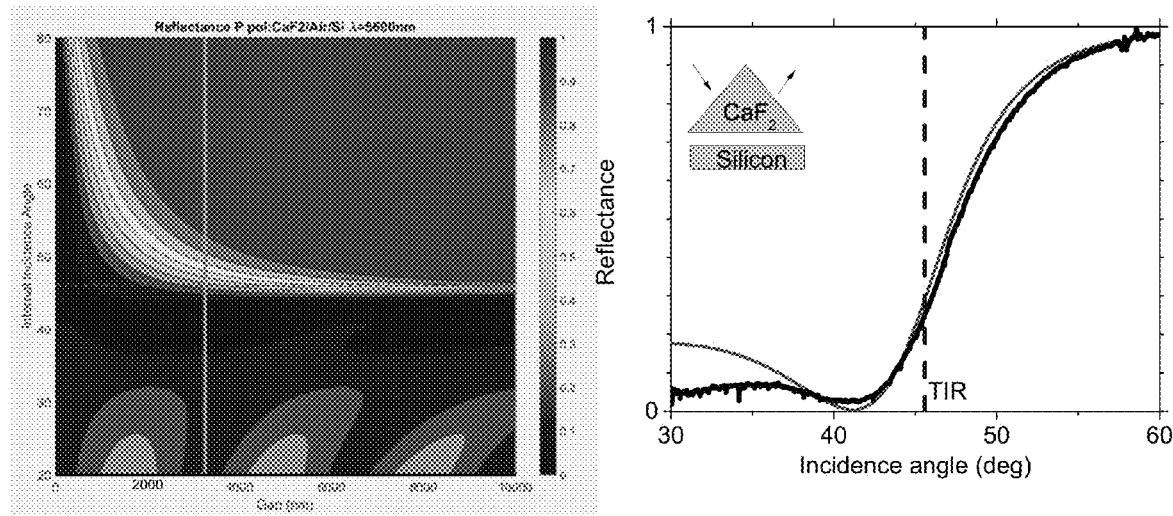
FIG. 15 is a set of graphs representing $CaF_2$/Air/Si Otto coupler results.

FIG. 15 compares experiment to theory for the Otto Coupler with Si as the conductive material. FIG. 15 (left) presents the reflectivity contours calculated vs. angle and gap, for an incident beam with 5.6 µm wavelength. The horizontal dashed line indicates the TIR angle $\theta_{TIR}$ for $CaF_2$. Above $\theta_{TIR}$ for very small gaps, Frustrated Total Internal Reflectance was observed, where the high-index silicon "draws" the beam out of the prism, causing it to be transmitted instead of reflected. Below $\theta_{TIR}$, reflectance is low, because here also the beam is largely transmitted. Fabry-Perot resonances were also observed below $\theta_{TIR}$, where the reflectance varies with gap with ~3 µm periodicity, which is about half the wavelength. The vertical line in FIG. 15 (left) indicates the gap for which the calculations best fit the experimental observations.

FIG. 15 (right) compares the angle-dependent reflectivity calculation to experiment. The plasma wavelength for Si is at least twice larger than the 5.6 µm operating wavelength [11]. Thus, theory predicts no possibility of generating an SPP for this experiment. Beyond $\theta_{TIR}$=45.58 deg, reflection is predicted to rise to monotonically to unity. The theory curve is confirmed by experiment. Importantly, no SPP resonance absorption band is observed in this region.

Figure 16:
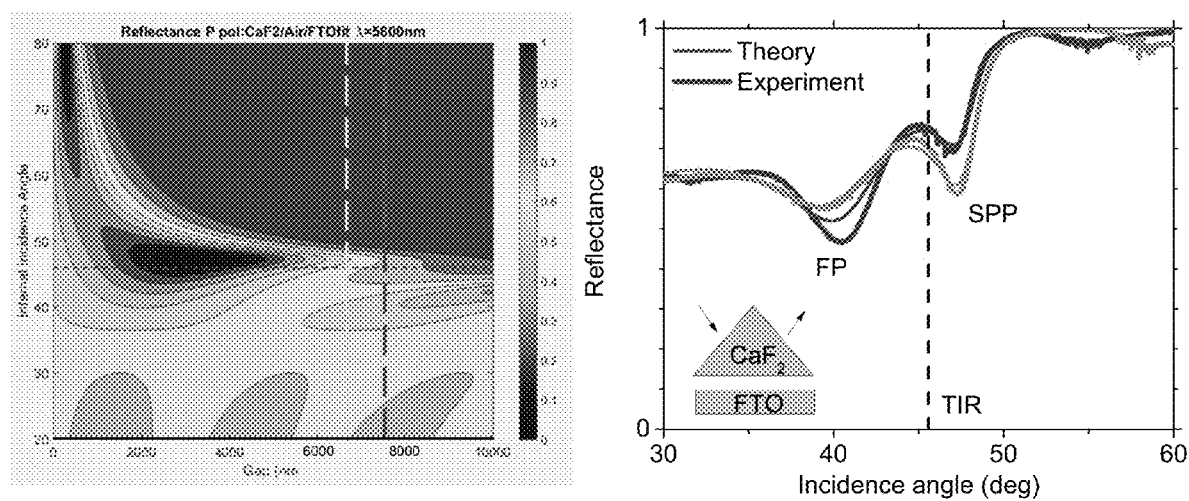
FIG. 16 is a set of graphs representing $CaF_2$/Air/FTO Otto coupler results, $\lambda_p \sim 2$ µm.

FIG. 16 presents results for an Otto Coupler using FTO film with plasma wavelength near 1 µm. This value is smaller than the 5.6 µm operating wavelength, so that excitation of an SPP is expected. From the contour plot, the SPP resonance is seen just beyond the TIR angle indicated by the horizontal dashed line. The minimum of this resonance occurs at a gap value of about 3 µm, where over 90% of the incident beam is absorbed. The resonance is about 5 deg wide. This gap value for optimum coupling is comparable to the SPP mode height for this FTO sample, according to FIG. 9. For larger gaps the SPP resonance weakens. For smaller gaps, evidence of frustrated total internal reflectance at all incidence angles beyond $\theta_{TIR}$ is observed. The best match to two separate experiments occurred at gaps of 6.8 and 7.2 µm indicated by the vertical dashed lines in FIG. 15 (left). FIG. 16 (right) compares these slices to experiment, showing good agreement.

Determining Apparent Temperature

Figure 17:
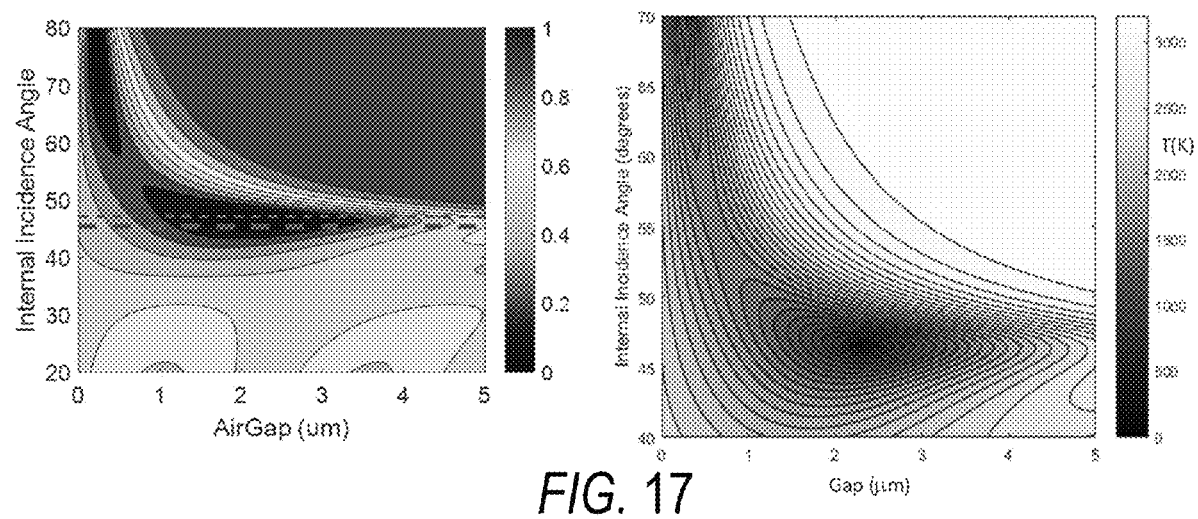
FIG. 17 (left) is a graph of reflectance contours for an Otto coupler with FTO and (right) is a graph of reflectance values converted to apparent temperature for a detector with flat responsivity bandwidth between 2 µm and 5 µm. Source wavelength=4.5 µm.

To determine apparent temperature as a function of Otto-coupler gap, the first reflectance contour was calculated as shown in FIG. 17 (left). These are similar to those calculated above, except that here the operating wavelength is assumed to be 4.5 µm and the conductor is a Drude metal with 1 µm plasma wavelength and other Drude parameters characteristic of FTO. The Planck function for the spectral energy density emitted by a black body was integrated at a given temperature T weighted by the response function of the detector system SR, which is proportional to detector area A, according to $$I_{BB}(T) = \pi \cdot A \cdot \int I_{plank}(\lambda, T) \cdot SR(\lambda) d\lambda \qquad \text{Eq. (3)}$$

Repeating this for different black-body temperatures gave an intensity function $I_{BB}(T)$. The intensity incident on the detector after reflection from a pixel of the subject scene projector was determined by an integral over the source spectrum $I_{QCL}$ weighted by the Otto-coupler reflectivity function R, according to $$\int R(\lambda, \theta, d) \cdot I_{QCL} d\lambda \qquad \text{Eq. (4)}$$

R is a function of wavelength, incidence angle, and gap, and is determined from calculated reflectance contours, e.g. FIG. 17 (left). Comparison of Eq. (4) to the function $I_{BB}(T)$ determines the equivalent temperature for that pixel, as shown in FIG. 17 (right). For a source intensity of 1 W and pixel pitch 100 µm, the values of the apparent temperature contours range from 200 to 2000 K.

Figure 18:
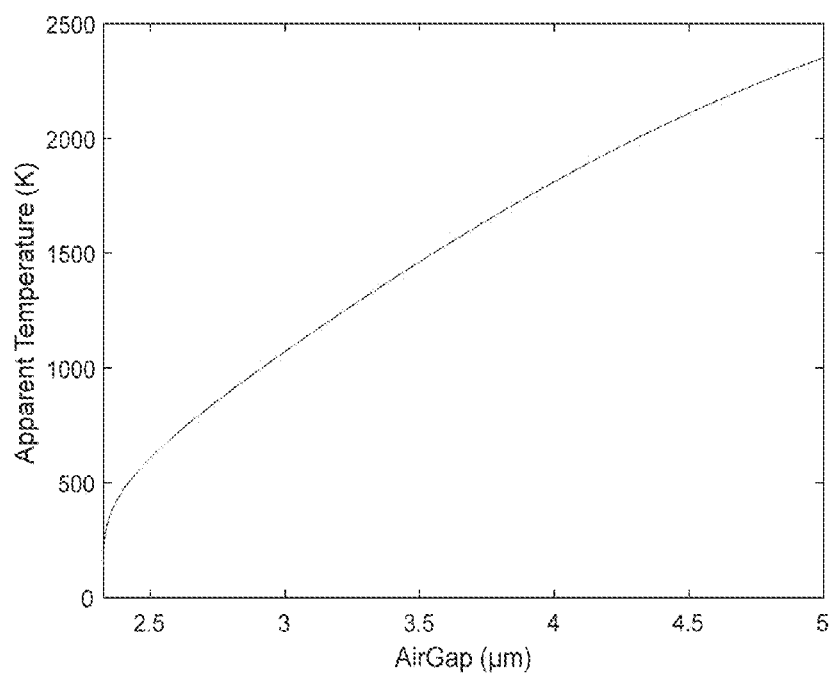
FIG. 18 is a graph of apparent temperature as a function of Otto coupler gap (d).

Taking a horizontal slice through the apparent temperature contours at an incidence angle of 46.5 deg, yields the curve shown in FIG. 18. This provides ~340 K for 2.33 µm gap and ~2000 K for 4.73 µm gap. The apparent temperature change is nearly linear with gap, because the non-linear gap dependence for the beam to excite SPPs is compensated by an opposite non-linearity in the temperature dependence of the Planck function.

The method of estimating the achievable apparent temperature from a measurement of the intensity outlined in the discussion of FIG. 17 and FIG. 18 underestimates the achievable apparent temperatures. This is because it ignores the difference in the angular distribution of radiation from a black body and from elements 310 of the optical device. In fact, a blackbody is a Lambertian emitter, where the emitted intensity varies as the cosine of the angle from the zenith, while the beam 104 from the elements 310 is much more highly concentrated in the forward direction.

A calculation of radiance includes the angular distribution of radiation. Radiance is Watts per unit area per unit solid angle subtended by the rays coming from the surface. Units are $W/m^2$-sr.

Due to the finite dimension of the elements 310, there is always some divergence of the reflected infrared beam from it, even for a perfectly collimated incident beam. Otherwise, the solid angle would be zero, and the radiance would be infinite. We assume that the incident IR beam 102 is perfectly collimated, so that it comprises perfectly parallel rays. Then the divergence of the light associated with the modulating element 310, determined by diffraction, is approximately the ratio of wavelength to dimension of the modulating element 310. The solid angle of the diverging rays is the square of that divergence angle. The maximum reflected intensity at the modulating element 310 is the same as the incident intensity. The maximum radiance is found by dividing maximum reflected intensity by the determined solid angle. The minimum radiance is just the maximum multiplied by the achievable attenuation caused by element 310.

We assume that the user-provided optical system accepts and detects infrared radiation only within the wavelength band 3 to 5 µm band with spectrally flat response. We compare the estimated radiance values from elements 310 with the in-band radiance of a black-body at a given temperature. We adjust the black-body temperature until the two radiance values are the same. Then that black-body temperature defines the effective temperature of the element 310. An advantage of the optical device 300 is that the solid angle of light from elements 310 is small, which enhances the radiance values in comparison to those of a Lambertian black-body, and hence enhances the effective temperatures.

The following is a sample calculation. We assume that optical device 300 is uniformly illuminated by a collimated 1 W QCL at 4.5 µm wavelength expanded over a 50 mm×50 mm area. The maximum reflected intensity is then 1 W/(0.05 m)$^2$=400 W/m$^2$. Assuming a 100 µm×100 µm element 310, the divergence angle for reflected light is 4.5 µm/100 µm=0.045 rad (2.6 deg). The solid angle is (0.045 rad)$^2$=0.002 sr. Thus, the maximum radiance for one modulating element is (400 W/m$^2$)/0.002 sr=2.0×

$10^5$ W/m$^2$-sr. This equals the radiance of a blackbody at 4200 K in the 3-5 µm band. (Radiance calculations for blackbodies are described in any textbook on infrared system engineering). If the maximum achievable attenuation factor by optical elements 310 is $10^{-5}$, the minimum radiance would be 2.0 W/m$^2$-sr, which is the same as that of a blackbody at 302 K in the 3-5 µm band.

In summary, an optical device 300 with 100 µm×100 µm elements 310 illuminated with collimated light from a 1 W QCL at 4.5 µm wavelength expanded over a 50 mm×50 mm area, and with variable attenuation from 1 to $10^{-5}$, would give radiance in the range 2.0 to 2.0×10$^5$ W/m$^2$-sr, corresponding to effective temperatures of 304 to 4200 K.

The skilled person in the art will understand that the scene generator and related methods may be modified in many different ways without departing from the scope of what is claimed. The scope of the claims is not limited to only the particular features and examples described above.

CITED REFERENCES

1. L. D. Landau, E. M. Lifshitz, and L. P. Pitaevskii, Electrodynamics of Continuous Media, 2nd Edition (Elsevier, Butterworth, Heinemann, 1984) section 88, problem.
2. A. Otto, "Excitation of nonradiative surface plasma waves in silver by the method of frustrated total reflection," Zeitschrift für Physik 216, 398 (1968).
3. I. Rezadad, J. Boroumand, E. M. Smith, and R. E. Peale, "Micro electro mechanical cantilever with electrostatically controlled tip contact," Appl. Phys. Lett. 105, 033514 (2014).
4. L. Wu and H. Xie, "A large vertical displacement electrothermal bimorph microactuator with very small lateral shift," Sensors and Actuators A 145-146 371 (2008).
5. J. W. Cleary, G. Medhi, R. E. Peale, W. R. Buchwald, O. Edwards, and I. Oladeji, "Infrared Surface Plasmon Resonance Biosensor," Proc. SPIE 7673, 5 (2010).
6. J. W. Cleary, R. E. Peale, D. J. Shelton, G. D. Boreman, C. W. Smith, M. Ishigami, R. Soref, A. Drehman, W. R. Buchwald, "IR permittivities for silicides and doped silicon," JOSA B 27, 730 (2010).
7. J. W. Cleary, G. Medhi, M. Shahzad, I. Rezadad, D. Maukonen, R. E. Peale, G. D. Boreman, S. Wentzell, and W. R. Buchwald, "Infrared surface polaritons on antimony," Optics Express 20, 2693 (2012).
8. J. W. Cleary, W. H. Streyer, N. Nader, S. Vangala, I. Avrutsky, B. Claflin, J. Hendrickson, D. Wasserman, R. E. Peale, W. Buchwald, and R. Soref, "Platinum germanides for mid- and long-wave infrared plasmonics," Optics Express 23(3) 3316-3326 (2015).
9. F. Khalilzadeh-Rezaie, C. W. Smith, J. Nath, N. Nader, M. Shahzad, J. W. Cleary, I. Avrutsky, and R. E. Peale, "Infrared surface polaritons on bismuth," J. Nanophotonics 9, 093792 (2015).
10. R. E. Peale, E. Smith, H. Abouelkhair, I. O. Oladeji, S. Vangala, T. Cooper, G. Grzybowski, F. Khalilzadeh-Rezaie, J. W. Cleary, "Electrodynamic properties of aqueous spray deposited SnO2:F films for infrared plasmonics," Opt. Eng. 56, 037109 (2017).
11. M. Shahzad, G. Medhi, R. E. Peale, W. R. Buchwald, J. W. Cleary, R. Soref, G. D. Boreman, and O. Edwards, "Infrared surface plasmons on heavily doped silicon," J. Appl. Phys. 110, 123105 (2011).
12. R. E. Peale, K. Muro, J. T. McWhirter and A. J. Sievers, "Incoherent saturation study of the selenium donor in AlSb," Sol. State Comm. 60, 753 (1986).
13. Fritz Keilmann, "Precision Broadband Far-Infrared Attenuator," Proc. SPIE 666, 213 (1986).
14. S. D. Hanton, "Variable attenuator for high-power lasers." Rev. Sci. Inst. 64, 1456 (1993).
15. S. E. Bialkowski, "Simple scheme for variable high-power laser beam attenuation," Rev. Sci. Inst. 58, 2338 (1987).
16. Wavelength Tech, BLK 2, Bukit Batok St. 24, #06-03, Skytech Building, Singapore 659480.
17. II-VI Infrared, 375 Saxonburg Blvd, Saxonburg, Pa. 16056, United States That which is claimed is:

1. A scene generator comprising:
    an infrared emitter that emits a beam of infrared radiation;
    an optical device on which the beam is incident, the optical device including at least one prism and an array of electrically conductive elements, the electrically conductive elements being respectively separated from the at least one prism by an adjustable distance, wherein the optical device modulates an intensity of the beam by selectively exciting dissipative surface plasmon polaritons on the electrically conductive elements and reflects a modulated beam therefrom; and
    a controller storing a first infrared scene and program instructions to adjust the distances in such a way that the modulated beam produces a second infrared scene representative of the first infrared scene.

2. The scene generator of claim 1, wherein the beam incident on the optical device is collimated, monochromatic, and linearly-polarized.

3. The scene generator of claim 1, wherein:
    the first infrared scene includes a set of first infrared scene pixels having respective infrared intensity values; and
    the program instructions are operable to adjust the distances according to the respective infrared intensity values.

4. The scene generator of claim 1, wherein:
    the first infrared scene includes a set of first infrared scene pixels having respective infrared intensity values; and
    a degree of modulation at a particular spatial location within the modulated beam is based on the infrared intensity value of the first infrared scene pixels at a corresponding spatial location in the first infrared scene.

5. The scene generator of claim 1, wherein the optical device includes one prism.

6. The scene generator of claim 1, wherein the optical device includes a prism per electrically conductive element.

7. The scene generator of claim 1, wherein the electrically conductive elements are made from a material whose real part of complex permittivity is negative at a wavelength of the beam.

8. A scene generator comprising:
    a data file including infrared intensity values of pixels of a first infrared scene;
    an infrared emitter that emits a collimated, monochromatic, and linearly-polarized beam of infrared radiation;
    an optical device on which the beam is incident, the optical device including at least one prism and an array of electrically conductive elements, the electrically conductive elements being respectively separated from the at least one prism by individually adjustable distances, wherein the optical device modulates an intensity of the beam by selectively exciting dissipative surface plasmon polaritons on the electrically conductive elements and reflects a modulated beam therefrom; and a controller storing program instructions operable to adjust the distances in such a way that the modulated beam produces a second infrared scene representative of the first infrared scene, the second infrared scene having two-dimensional spatial components corresponding with locations of the pixels of the first infrared scene, the infrared intensity values of the two-dimensional spatial components being based on the infrared intensity values of the pixels of the first infrared scene.

9. The scene generator of claim 8, wherein the program instructions are operable to adjust the distances according to the respective infrared intensity values of the pixels of the first infrared scene.

10. The scene generator of claim 8, wherein a degree of modulation at a particular spatial location within the modulated beam is based on the infrared intensity value of at least one of the first infrared scene pixels at a corresponding spatial location in the first infrared scene.

11. The scene generator of claim 8, wherein the optical device includes one prism.

12. The scene generator of claim 8, wherein the optical device includes a prism per electrically conductive element.

13. The scene generator of claim 8, wherein the electrically conductive elements are made from a material having a real part of the complex permittivity that is negative at a wavelength of the beam.

14. A method comprising generating a second infrared scene representative of a first infrared scene by emitting a beam of electromagnetic radiation onto a plurality of prism-coupled electrically conductive elements that modulate a portion of the beam incident thereon with surface plasmon polaritons based on parameters of the first infrared scene, yielding a modulated beam that produces the second infrared scene.

15. The method of claim 14, wherein the beam is collimated and monochromatic and linearly polarized.

16. The method of claim 14, wherein:

the parameters of the first infrared scene include a set of infrared intensity values corresponding with first infrared scene pixels; and a degree of modulation at a particular spatial location within the modulated beam is based on the infrared intensity value of at least one of the first infrared scene pixels at a corresponding spatial location in the first infrared scene.

17. The method of claim 14, wherein a degree of modulation produced by a respective electrically conductive element is adjusted by changing a distance between the electrically conductive element and the prism.

18. The method of claim 14, including one prism per a plurality of electrically conductive elements.

19. The method of claim 14, including a prism per electrically conductive element.

20. The method of claim 14, wherein the electrically conductive elements are made from a material having negative real part of the complex permittivity at a wavelength of the beam.

* * * * *